(12) United States Patent
Dujarric

(10) Patent No.: US 7,603,842 B2
(45) Date of Patent: Oct. 20, 2009

(54) METHOD FOR REDUCING THE NONSTEADY SIDE LOADS ACTING ON A NOZZLE OF A ROCKET ENGINE

(75) Inventor: Christian Dujarric, Paris (FR)

(73) Assignee: Agence Spatiale Europeenne (FR)

( * ) Notice: Subject to any disclaimer, the term of this patent is extended or adjusted under 35 U.S.C. 154(b) by 656 days.

(21) Appl. No.: 11/359,692

(22) Filed: Feb. 22, 2006

(65) Prior Publication Data

US 2007/0063073 A1     Mar. 22, 2007

(30) Foreign Application Priority Data

Feb. 22, 2005   (FR) ................................. 05 01772

(51) Int. Cl.
*F02K 1/00* (2006.01)
(52) U.S. Cl. ................. 60/204; 60/233; 239/265.19
(58) Field of Classification Search .............. 60/204, 60/233, 242, 257, 771; 239/265.11, 265.19
See application file for complete search history.

(56) References Cited

U.S. PATENT DOCUMENTS

| | | | |
|---|---|---|---|
| 2,674,088 A | | 4/1954 | Riedel et al. |
| 3,059,425 A | * | 10/1962 | McSherry et al. .............. 60/242 |
| 5,560,559 A | * | 10/1996 | Larsen ..................... 244/171.2 |
| 5,607,123 A | * | 3/1997 | Larsen ........................ 244/52 |
| 2002/0157399 A1 | | 10/2002 | Dujarric |

FOREIGN PATENT DOCUMENTS

EP            0 508 851 A        10/1992

OTHER PUBLICATIONS

Frey M. et al., "Flow Separation and Side-Loads in Rocket Nozzles", *AIAA/SAE/ASME/ASEE Joint Propulsion Conference and Exhibit*, Jun. 20, 1999, pp. 1-11.

* cited by examiner

*Primary Examiner*—Louis J Casaregola
(74) *Attorney, Agent, or Firm*—Alston & Bird LLP

(57) ABSTRACT

A method for reducing the nonsteady side loads acting on a nozzle of a rocket engine during a startup phase of said engine. The nozzle comprises a combustion chamber (1) where exhaust gases are generated, a divergent portion (3) in which a supersonic flow of said exhaust gases occurs, and a throat (2) connecting the combustion chamber to the divergent portion, which method comprises the positioning of a body of rounded shape (5) inside the divergent portion (3) along its axis corresponding to an axial position such that, during at least part of the startup phase, a shock wave (8), induced by the distrubance of the flow of the exhaust gases by the body of rounded shape (5) is incident to the wall of the divergent portion (3) at an axial incidence position where it produces a jet separation or a separation in the form of a toroidal separation bulb.

11 Claims, 4 Drawing Sheets

METHOD FOR REDUCING THE NONSTEADY SIDE LOADS ACTING ON A NOZZLE OF A ROCKET ENGINE

FIELD AND BACKGROUND OF THE INVENTION

The invention relates to a device and method for reducing the nonsteady side loads acting on a nozzle of a rocket engine, particularly during the startup or ignition phase of said engine.

The invention can be used in particular to eliminate, or at least substantially limit, the nonsteady side loads occurring in the nozzle of a rocket engine during the ignition thereof, caused by the effect known as jet separation, or the separation of the boundary layer, or a separation by internal recirculation in the jet.

It is known that the thrust of a rocket engine depends on its mass flow rate, on the stagnation pressure $p_s$ in the combustion chamber, on the nozzle expansion ratio, that is, on the ratio $p_s/p_e$ between the stagnation pressure $p_s$ and the static ejection pressure of the gases at the nozzle exit $P_e$, and on the ambient pressure $p_a$. This thrust reaches a peak, for a given set of chamber operating conditions, when the two pressure values $P_e$ and $p_a$ are equal (the nozzle is then said to be adapted). It is also known that rocket engines are normally designed to reach the matching condition $P_e = p_a$ at an altitude higher than the launch altitude, for example, of about 10 000 m and that, in consequence, at low altitude, $P_e < p_a$ (operating condition of the nozzle in overexpansion). If the static ejection pressure of the gases at the nozzle exit $p_e$ is significantly lower than the ambient pressure $p_a$ (for example, lower than 0.2 $p_a$), a jet separation occurs inside the divergent portion of the nozzle. Two types of separation are known: separation by free shock wave (also called free shock separation in English publications) and separation by internal recirculation in the jet (also called restricted shock separation in English publications). For certain nozzle geometries and/or under certain expansion ratio conditions, the boundary layer of the supersonic gas flow separates from the wall of the divergent portion of the nozzle, in a separation mode called a free shock wave separation mode, and the jet is compressed by an oblique shock wave and a side load is applied locally at every point of the wall of said divergent portion downstream of the separation point. This side load is created by the pressure difference between the outer wall of the divergent portion to which the atmospheric pressure is applied and the inner wall of the divergent portion to which the local static pressure of the jet is applied. If the jet separation were perfectly symmetrical and stable over the whole circumference of the nozzle and at a defined axial position, the local static pressure of the jet would be uniform over the circumference of the nozzle, and the resultant of these side loads would be zero. In reality, the jet separation line has an irregular and highly nonsteady shape. It follows that at every instant, the jet separation produces a nonzero resultant load, which may have a considerable moment with respect to the throat of the nozzle, at the place where the structural moment of inertia of the engine is the lowest. This clearly explains why the most critical situation occurs when the jet separation mainly takes place on a single side of the nozzle and close to the exit section. For other nozzle geometries, or with other expansion ratio conditions for the same nozzle, a different separation mode may occur, called separation mode by internal recirculation in the jet, and which also generates harmful nonsteady side loads. In this separation mode, as in the previous one, the boundary layer of the supersonic gas flow separates from the wall of the divergent portion of the nozzle, but, because of the level of the downstream pressures, the flow immediately reattaches to the wall of the divergent portion, thereby forming a toroidal separation bulb. The position of this toroidal separation bulb is controlled by a shock created at the center of the flow by a broad gas recirculation that shifts randomly, randomly affecting the position of the central shock and the position of the toroidal separation bulb. Downstream of the toroidal separation bulb, the jet remains supersonic and attached to the wall, but it is compressed by an oblique shock wave of which the intensity varies with the Mach number of the incident flow and therefore with the position of the toroidal separation bulb. As a result, the static pressures at the wall downstream of the toroidal separation bulb vary randomly. As in the case of the free shock wave separation, a side load is locally applied at every point of the wall of said divergent portion downstream of the separation point. This side load is created by the pressure difference between the outer wall of the divergent portion to which the atmospheric pressure is applied and the inner wall of the divergent portion to which the local static pressure of the jet is applied. If the toroidal separation bulb were perfectly symmetrical, coaxial with the nozzle, stable over time throughout the circumference of the nozzle and at a defined axial position, the recompression due to the shock that it generates would be uniform and the local static pressure of the jet downstream would be uniform over the circumference of the nozzle, and the resultant of these side loads would be zero. In reality, for the reasons set forth above, the separation line of the toroidal separation bulb has an irregular and highly nonsteady shape. It follows that at every instant, the separation by internal jet recirculation induces a nonzero resultant load, which may have a considerable moment with respect to the throat of the nozzle, at the place where the structural moment of inertia of the engine is the lowest. This clearly explains why the most critical situation appears when the separation by internal jet recirculation mainly takes place in a half along a vertical cross section of the nozzle and close to its exit section.

The need to maintain the nonsteady loads induced by the jet separation at an acceptable level requires limiting the value of the expansion ratio $p_s/p_e$ to below its optimal value and overdimensioning the nozzle structure, thereby reducing the overall performance of the engine and its thrust/weight ratio. Despite these precautions, the nonsteady loads generated by the jet separation cause considerable vibrations that are liable to damage the nozzle and even to cause it to break if, with the passage of time, the random pressure distribution in the divergent portion becomes excessively unfavorable.

A thorough analysis of the jet separation mechanisms in rocket engine nozzles and the resulting nonsteady side loads is provided in the article by G. Hagemann, M. Terhardt, M. Frey, P. Reijasse, M. Onofri, F. Nasuti and J. Östlund, "Flow Separation and Side-Loads in Rocket Nozzles", presented to the 4th International Symposium on Liquid Space Propulsion, Lampoldshausen, Germany, 13-15 March 2000.

Numerous devices have been proposed for controlling the jet separation inside a rocket engine nozzle in order to limit said nonsteady side loads, and in particular the following.

Document U.S. 6,572,030 discloses the use of a droppable annular structure, extending radially and designed to be placed around the nozzle exit section. This structure causes the formation of a low pressure zone close to said exit section, thereby reducing the jet separation inside the nozzle.

Document U.S. 5,894,723 discloses the use of ejectable inserts inside the nozzle. Following ascension, the ejection of said inserts increases the ratio of the area of the nozzle exit section to the area of its throat, thereby enabling the engine to operate in near matching conditions throughout the rocket ascension phase.

Document U.S. 5,490,629 discloses the use of an ejectable diffuser, connected to the nozzle exit section and having a contraction to recompress the gases and thereby prevent the jet separation during the first part of the rocket's trajectory.

Document U.S. 5,481,870 discloses the use of a droppable annular obstacle, connected to the nozzle exit section and partially obstructing it so as to cause a stable jet separation.

Document U.S. 5,450,720 discloses the use of longitudinal slots in the downstream end portion of the nozzle to cause a stable jet separation.

All these documents disclose solutions to the problem of eliminating or limiting the nonsteady side loads generated in the nozzle of a rocket engine during the first part of its ascent phase from liftoff to the altitude at which the matching condition is reached. However, none of the devices described therein is suitable for limiting the appearance of nonsteady side loads while the stagnation pressure in the engine combustion chamber has not yet reached its nominal value, that is, even before the liftoff of the rocket, during the engine startup phase. During this phase, which lasts about one second or slightly less, the stagnation pressure $p_s$ of the gases in the combustion chamber increases rapidly from atmospheric to a peak value and, in consequence, the mean position of the jet separation line shifts toward the nozzle exit section, making ineffective the known control means of the prior art, of which the geometric definition is fixed with respect to the nozzle. Furthermore, these documents propose the use of devices which are integral with the nozzle during at least part of the ascent phase of the rocket, and which thereby increase its weight, which is contrary to one of the goals of controlling the jet separation, which is to lighten the nozzle by reducing the loads to which it is subjected.

The only known prior art document that presents a solution to the problem of limiting the nonsteady side loads during the engine startup phase without making the nozzle heavier, is document FR 2 791 398, which discloses a system for stabilizing the jet separation, comprising a device outside the engine, integral with a ground installation, consisting of a set of injection tubes sending countercurrent fluid jets into the nozzle toward impact points on the wall thereof. A jet separation region is produced from each impact point and extends toward the nozzle exit section in a conical configuration. Such a system causes an overall reduction of the nonsteady side loads in the nozzle and has the advantage of being mounted on a ground installation and not carried by the rocket itself, but it is not fully satisfactory because it does not effectively stabilize the jet separation throughout the engine startup phase, since the countercurrent jets impact the nozzle at positions that are fixed and independent of the pressure in the combustion chamber. Furthermore, as shown in FIG. 1 of document FR 2 791 398, the jet separation lines originating from each impact point intersect the edge of the nozzle exit section. In fact, these lines have a stable position at the impact point of the countercurrent fluid jet that initiates them, but can fluctuate downstream of this point, thereby inducing residual nonsteady loads. This is particularly undesirable because these residual loads are applied correspondingly from the edge of the nozzle exit section, that is, at the place where they are most detrimental, because their moment with respect to the nozzle throat is at maximum.

SUMMARY OF THE INVENTION

One object of the invention is to obtain improved control of the jet separation during the startup phase of a rocket engine, and thus to reduce the nonsteady loads acting on the divergent portion of the nozzle.

Another object of the invention is to obtain such control without increasing the weight of the nozzle or of the rocket.

Another object of the invention is to obtain such control using a simpler and more economical device than the known devices of the prior art.

A further object of the invention is to propose a device and a method for controlling the jet separation during the startup phase of a rocket engine, which can be used together with a known device of the prior art to control the jet separation during the rocket ascension phase, in order to obtain such control during a large part of the period during which the engine operates in the atmosphere.

A further object of the invention is, through improved control of the jet separation, to improve the overall performance of the rocket engine by lightening its structure and by increasing its expansion ratio.

At least one of these objects is achieved by a method for reducing the nonsteady side loads acting on a nozzle of a rocket engine during a startup phase of said engine, said nozzle comprising a combustion chamber where exhaust gases are generated, a divergent portion in which a supersonic flow of said exhaust gases occurs, and a throat connecting said combustion chamber to said divergent portion, characterized in that it comprises the positioning of a body of rounded shape inside the divergent portion along its axis corresponding to an axial position of the body of rounded shape such that, during at least part of said startup phase, a shock wave, induced by the disturbance of the flow of the exhaust gases by said body of rounded shape, is incident to the wall of said divergent portion at an axial incidence position where it produces a jet separation or a separation in the form of a toroidal separation bulb.

According to particular embodiments of the invention:

the method may also comprise prior to the startup of the engine, the insertion of said body of rounded shape inside the divergent portion along its axis, up to a first axial position and during the startup phase, the movement of said body of rounded shape along the nozzle axis according to a value of the stagnation pressure of the exhaust gases in the combustion chamber so that, while the value of said stagnation pressure of the exhaust gases varies during said startup phase, said shock wave continues to be incident to the wall of the divergent portion at an axial position where it produces a jet separation or a separation in the form of a toroidal separation bulb;

the movement of said body of rounded shape along the nozzle axis according to a value of the stagnation pressure of the exhaust gases in the combustion chamber is actuated so that said shock wave is incident to the wall of said divergent portion at an axial position corresponding to the downstream limit of the region of said divergent portion where a spontaneous jet separation or a spontaneous separation in the form of a toroidal separation bulb does not occur under the action of the ambient pressure.

the movement of said body of rounded shape according to the stagnation pressure of the exhaust gases in the combustion chamber may follow a setpoint which is determined using the following steps: choice of a series of discrete values of the stagnation pressure of the exhaust gases in the combustion chamber, ranging between the atmospheric pressure and a maximum pressure reached during the startup phase; choice of a series of discrete values of the position of said body of rounded shape along the axis of the divergent portion, ranging between the position of the throat and that of the exit section of said divergent portion; for each pair of said discrete values, determination by calculation or by test of the value of static pressure and the Mach number along the wall of the divergent portion and determination of the shock impact point on the nozzle wall; for each pair of said discrete values, determination of the axial position of the jet separation point or of the point of separation in the form of a toroidal separation bulb using said values of static pressure and of the Mach number of the exhaust gas flow along the wall of the divergent portion; for each of said discrete values of the pressure of the exhaust gases in the combustion chamber, determination of the position of said body of rounded shape furthest downstream, such that the jet separation or the separation in the form of a toroidal separation bulb is caused by said shock wave induced by the presence of said body of rounded shape; said furthest downstream value being used as the setpoint value of the position of said body of rounded shape corresponding to said value of the stagnation pressure of the exhaust gases in the combustion chamber;

the method may further comprise an interpolation of said setpoint values of the position of said body of rounded shape corresponding to said values of the stagnation pressure of the exhaust gases in the combustion chamber so as to determine a position setpoint in analytical form;

said axial position of the point of spontaneous jet separation or the spontaneous separation in the form of a toroidal separation bulb under the action of the ambient pressure is determined using an appropriate empirical or semiempirical criterion;

said body of rounded shape is moved from said axial position toward the exit section of the divergent portion during the engine startup phase as the stagnation pressure of the exhaust gases in the combustion chamber increases;

said value of the stagnation pressure of the exhaust gases in the combustion chamber is determined either directly from a pressure measurement in the pressure chamber or indirectly from a measurement of the stagnation pressure of said exhaust gases corresponding to an apex of said body of rounded shape.

At least one of the abovementioned objects is also achieved using a device for reducing the nonsteady side loads acting on a nozzle of a rocket engine during a startup phase of said engine, said nozzle comprising a combustion chamber where exhaust gases are generated, a divergent portion in which a supersonic flow of said exhaust gases occurs, and a throat connecting said combustion chamber to said divergent portion, that comprises:

a body of rounded shape for positioning inside the divergent portion along its axis; and means for positioning said body of rounded shape inside the divergent portion corresponding to an axial position of the body of rounded shape such that, during at least part of said startup phase, a shock wave, induced by the disturbance of the flow of the exhaust gases, by said body of rounded shape is incident to the wall of said divergent portion at an axial incidence position where it produces a jet separation or a separation in the form of a toroidal separation bulb.

According to particular embodiments of the invention:

the device may further comprise means for moving said body of rounded shape along the axis of the divergent portion according to a value of the stagnation pressure of the exhaust gases in the combustion chamber so that, while the value of said stagnation pressure of the exhaust gases varies during said startup phase, said shock wave continues to be incident to the wall of the divergent portion at an axial position where it produces a jet separation or a separation in the form of a toroidal separation bulb;

said means for moving said body of rounded shape along the axis of the divergent portion may comprise an actuator for moving said body of rounded shape along the axis of the divergent portion;

the device may further comprise a controller for receiving from a first sensor a value datum of the stagnation pressure of the exhaust gases in the combustion chamber and for commanding said actuator to move said body of rounded shape along the axis of the divergent portion according to said value datum of the stagnation pressure of the exhaust gases in the combustion chamber;

said controller is a controller for commanding the movement of said body of rounded shape along the axis of the divergent portion of the nozzle according to a position setpoint determined using the following steps: choice of a series of discrete values of the stagnation pressure of the exhaust gases in the combustion chamber, ranging between the atmospheric pressure and a maximum pressure reached during the startup phase; choice of a series of discrete values of the position of said body of rounded shape along the axis of the divergent portion, ranging between the position of the throat and that of the exit section of said divergent portion; for each pair of said discrete values, determination by calculation or by test of the value of static pressure and the Mach number along the wall of the divergent portion and determination of the shock impact point on the nozzle wall; for each pair of said discrete values, determination of the axial position of the jet separation point, or the point of separation in the form of a toroidal separation bulb, using said values of static pressure and of the Mach number along the wall of the divergent portion; for each of said discrete values of the stagnation pressure of the exhaust gases in the combustion chamber, determination of the position of said body of rounded shape furthest downstream, such that the jet separation or the separation in the form of a toroidal separation bulb is caused by said shock wave induced by the presence of said body of rounded shape; said furthest downstream value being used as the setpoint value of the position of said body of rounded shape corresponding to said value of the stagnation pressure of the exhaust gases in the combustion chamber;

said position setpoint has an analytical form, determined using an additional operation of interpolation of said setpoint values of the position of said body of rounded shape corresponding to said values of the stagnation pressure of the exhaust gases in the combustion chamber;

said axial position of the point of spontaneous jet separation or the spontaneous separation point in the form of a toroidal separation bulb under the action of the ambient pressure is determined using an appropriate empirical or semiempirical criterion;

said controller is a controller for commanding the movement of said body of rounded shape along the axis of the divergent portion of the nozzle from said axial position toward the exit section of the divergent portion during the engine startup phase as the stagnation pressure of the exhaust gases in the combustion chamber increases;

the body of rounded shape has a concave surface having an apex designed to be oriented toward the throat of the nozzle and may comprise a pressure sensor arranged to correspond with said apex;

said means for moving the body of rounded shape along the axis of the divergent portion according to a value of the stagnation pressure of the exhaust gases in the combustion chamber may comprise means for applying an elastic force against the expulsion of said body of rounded shape from said divergent portion by said exhaust gases instead of the actuator;

said body of rounded shape has an axial symmetry and has a rounded surface designed to be oriented toward the throat of the nozzle;

said body of rounded shape has a cross section of between 0.5 and 2 times, and preferably between 0.8 and 1.5 times, the cross section of the throat of the nozzle;

the device may further comprise a mechanical fuse for the expulsion of the body of rounded shape from the divergent portion when an axial load exerted on said body exceeds a preset threshold.

BRIEF DESCRIPTION OF THE DRAWINGS

Other features, details and advantages of the invention will appear from a reading of the description with reference to the drawings appended hereto, provided as examples, and which show.

DETAILED DESCRIPTION OF THE INVENTION

Figure 1:
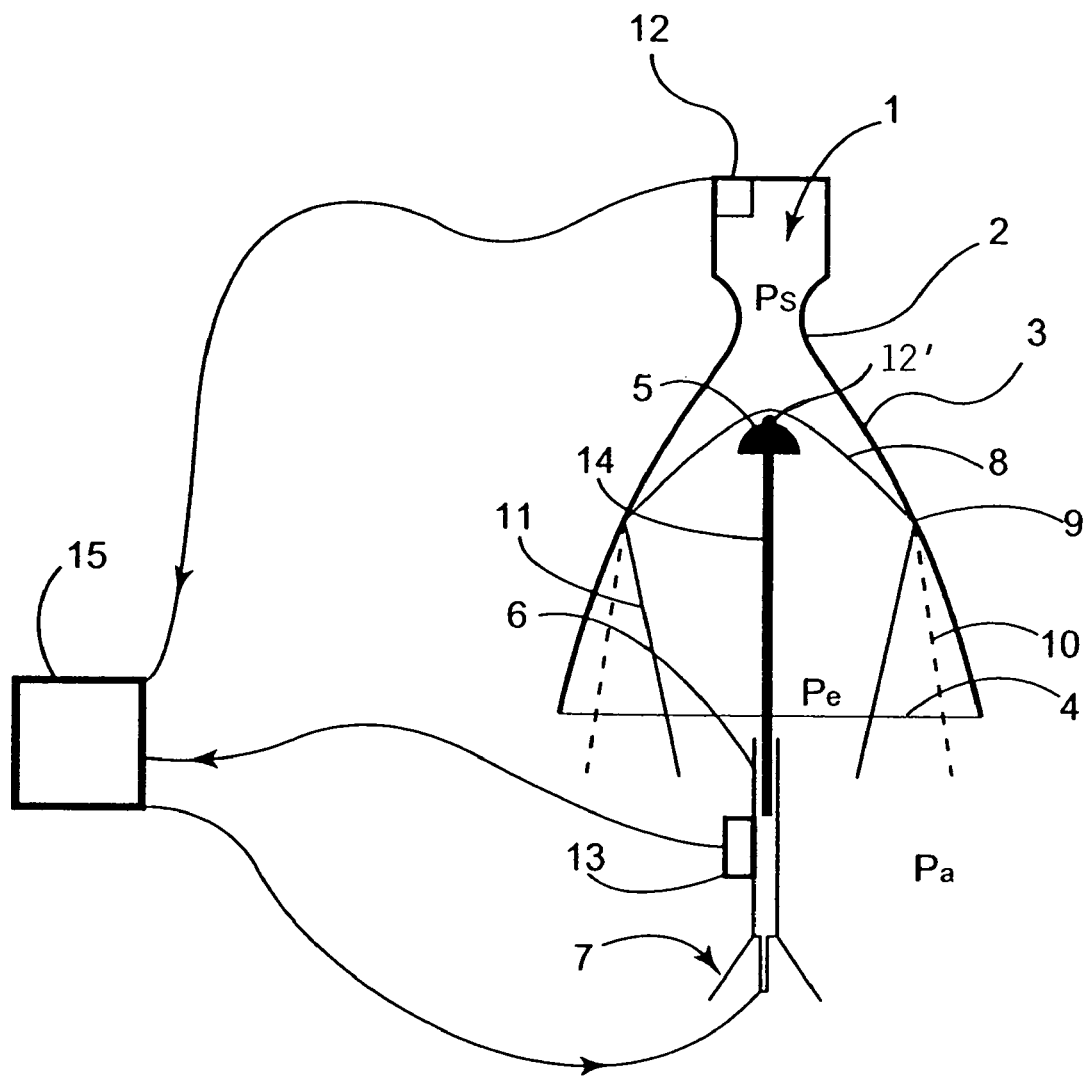
FIG. 1, a device for controlling jet separation according to the invention arranged in an operational configuration in the nozzle of a rocket engine that presents a spontaneous free shock wave separation mode.

A rocket engine comprises a combustion chamber 1 in which high temperature and high pressure gases are generated (stagnation pressure $p_s$), and a nozzle comprising: a convergent portion connected to said combustion chamber 1, a throat 2 in which the flow of said gases reaches transonic conditions and a divergent portion 3 in which said flow undergoes expansion and acceleration to supersonic speed. The exit section 4 of the divergent portion terminates outside the engine, in an environment where an external pressure $p_a$ prevails, which is about 1 atmosphere at the launch altitude and decreases during the ascension of the rocket to a negligible value when the rocket exits the earth's atmosphere.

In the rest of the description:

x is the distance between any point of the divergent portion 3 and the throat 2, measured along the nozzle axis;

A(x) is the effective aerodynamic area of the cross section of the nozzle at a distance x from the throat; the aerodynamic area is given by the geometric area less the area corresponding to the displacement thickness of the boundary layer;

$A_t = A(x=0)$ is the effective aerodynamic area of the cross section of the throat 2;

$A_e$ is the effective aerodynamic area of the cross section of the exit 4 of the divergent portion 3;

p(x) is the static pressure of the gases at the pressure x;

$p_e$ is the static pressure of the gases corresponding to the exit section 4 of the divergent portion 3; at the launch altitude, the nozzle is considered to be in overexpansion conditions, that is, that the value of the ambient (atmospheric) pressure $p_a$ is substantially higher than the theoretical value that $p_e$ would be if the engine operated in vacuum;

M(x) is the Mach number, which is equal to the ratio of the flow speed to the speed of sound in the gases generated in the combustion chamber; and Y is the isentropic expansion exponent of said gases.

In the isentropic supersonic flow zone, upstream of any shock generated by a liftoff or by the body of rounded shape, the values of A(x) and M(x) are related by the following equation:

$$\frac{A(x)}{A_t} = \left(\frac{2}{\gamma+1}\right)^{\frac{\gamma+1}{2(\gamma-1)}} \frac{1}{M(x)}\left(1 + \frac{\gamma-1}{2}M^2(x)\right)^{\frac{\gamma+1}{2(\gamma-1)}} \qquad [1]$$

If, as a first approximation, it is considered that A(x) is known and independent of the flow conditions, equation [1] can be used to calculate the Mach number at each point of the nozzle. The value of the pressure p(x) in the nozzle depends on the Mach number and the stagnation pressure in the combustion chamber, $p_s$:

$$\frac{p(x)}{p_s} = \left(1 + \frac{\gamma-1}{2}M^2\right)^{\frac{\gamma}{1-\gamma}} \qquad [2]$$

Equations [1] and [2] express the flow characteristics in the nozzle throughout the isentropic supersonic flow zone, not only for operation in vacuum, when $p_a=0$, but also when the nozzle operating at altitude is matched ($p_a=p_e$), or even in slight overexpansion conditions ($p_a>p_e$). In the latter case, the gases are compressed at the nozzle exit by shock waves caused by a separation of the boundary layer and equations [1] and [2] are not sufficient to determine the speed and pressure of the gases downstream of these shock waves. It is in these overexpansion conditions that the jet separation effect occurs, as described by the abovementioned article by G. Hagemann et al. Various theoretical, empirical or semiempirical criteria have been proposed for determining the position x_sep at which the separation occurs. One of the simplest and most widely used is the Schmucker criterion:

$$\frac{p(\text{x\_sep})}{p_a} = [1.88 M(\text{x\_sep}) - 1]^{-0.64} \quad [3]$$

where M(x) is given by equation [1] and p(x) by equation [2]; in fact, the separation point is located at the downstream limit of the isentropic zone, allowing the use of equations (1) and (2) to determine the parameters p and M in the criterion (3). For x>x_sep the gas pressure increases and no longer obeys equation [2].

It should be kept in mind that the criterion expressed by equation [3] only gives an estimate of a mean position of the jet separation "point" which, in reality, fluctuates over time: in practice, it is preferable to speak of a jet separation region centered around the position x=x_sep. For example, NASA considers that for the nozzle geometries that it has investigated, this region generally extends between x_sep−20% and x_sep+20%: such an estimate should provide a sufficiently precise range in most cases, but in actual fact, a more accurate study could advantageously be made for each particular nozzle geometry.

Clearly, it is also possible to simulate the flow numerically, instead of relying on analytical models. Moreover, more sophisticated models can be used, taking account of the gas viscosity, the nonisentropic character of the flow, the properties of the boundary layer, etc. Furthermore, it must be considered that the precise mechanism generating the nonsteady side loads is not yet fully understood (see the abovementioned article by G. Hagemann et al.).

We have so far considered the case in which $p_s$ is fixed and $p_a$ varies. In actual fact, during the startup of the engine $p_a$ is fixed and $p_s$ progressively increases from a value of $p_a$ to a steady value within an interval of about one second.

Initially, $p_s = p_a$ and no flow occurs. As the pressure $p_s$ then increases in the combustion chamber 1, a flow occurs, first in subsonic conditions. At a certain value of $p_s$, a shock wave appears at the throat 2 of the nozzle and M(x=0)=1; as $p_s$ increases further, a shock wave shifts in the divergent portion 3 toward the exit section 4 and a jet separation occurs approximately corresponding to the position x_sep satisfying the criterion [3] (or any other appropriate criterion). As $p_s$ increases, the separation region shifts further downstream. This has two consequences: the surface to which the nonsteady side loads are applied increases, thereby increasing the strength of said loads, and the moment of the resultant of these loads with respect to the throat also increases due to the movement of its point of application. Hence it is toward the end of the startup phase that the loads to which the nozzle structure are subjected are the highest.

Normally, it is under these conditions that the maximum stagnation pressure is reached; subsequently, after liftoff, $p_s$ remains constant and $p_a$ decreases as the rocket rises. The matching condition is thus reached, followed by the underexpansion condition ($p_e > p_a$).

The flow topology in the nozzle in overexpansion conditions during engine startup can show two kinds of separations during the engine startup, free shock wave separation and separation by internal recirculation in the jet, also called jet separation by restricted shock wave (see abovementioned article by G. Hagemann et al.). However, it should be pointed out that during the ignition of a nozzle in overexpansion conditions, for example during the startup of a rocket engine, the expansion ratio rises with the pressure in the combustion chamber $p_s$, and the shock configuration that appears first is the simplest configuration, with a free shock wave separation and a separation at the wall as described above. Using the method described above, it is therefore possible to determine, at least approximately, the region of a given nozzle in which the jet separation initially occurs.

The idea underlying the present invention, illustrated by FIG. 1, consists in causing the formation of a stable, predictable detached shock wave 8 inside the nozzle, this shock wave being incident to the nozzle wall at a position 9, the interaction between the shock wave 8 and the boundary layer of the flow close to the nozzle wall causing the separation of said boundary layer, that is, the separation of the jet; in FIG. 1, the numeral 10 indicates the limitation of the separation region and numeral 11 the shock wave reflected by the point of incidence 9. In contrast to the case of "natural" jet separation, caused by the ambient pressure $p_a$, the jet separation caused by the shock wave 8 is stable, localized and independent of any disturbance from downstream, making it possible to eliminate, or at least to substantially reduce the nonsteady side loads. The physics of the interaction between a shock wave and a boundary layer is described in the article by J. Déléry and R. Bur "The Physics of Shock Wave/Boundary Layer Interaction Control: Last Lessons Learned" ECCOMAS 2000, Barcelona (Spain), 11-14 September 2000.

The inventor realized the fact that one of the reasons for which the device of document FR 2 791 398 is unable to effectively stabilize the jet separation throughout the engine startup phase is the fact that the position of the impact points of the countercurrent jets which trigger the jet separation, remains constant. Thus, during the first engine startup phase, a spontaneous jet separation may occur upstream of said impact points, whereas in the final startup phase, the same points may be located too far upstream. In fact, it has been found that an optimal position of the point of incidence 9 of the shock wave 8 exists according to the value of the stagnation pressure $p_s$. In fact, said point 9 must be located sufficiently upstream to determine the jet separation alone, before the effect of the ambient pressure $p_a$ begins to be felt, but simultaneously, sufficiently close to the point where a spontaneous separation appears under the effect of the atmospheric pressure to encounter a boundary layer that is "weakened" and hence easy to separate. In conclusion, said optimal position of the point of incidence 9 is the position furthest downstream, such that the jet separation is nevertheless caused by the shock wave 8 rather than being spontaneous. For this reason, the invention is suitable for shifting the point of incidence 9 of the shock wave 8 during the engine startup phase, so that said point of incidence 9 is constantly close to its optimal position.

FIG. 1 shows that a device according to the invention comprises a body of rounded shape 5, mounted on a rod 14 which may be moved in an axial direction by an actuator 6 guided by a controller 15. As input, the latter receives a pressure value $p_s$ of the exhaust gases inside the chamber, obtained by a first sensor 12, and a position datum of said body of rounded shape 5, obtained by a second sensor 13 and guides the actuator 6 so that the axial position of said body 5 is constantly close to a setpoint value that depends on said pressure value $p_s$. In operational conditions, the body 5 is arranged inside the divergent portion 3 of the nozzle, so as to move along its axis.

It may be observed that the device, essentially consisting of the body 5, the rod 14, the actuator 6, the second sensor 13 and the controller 15 (the first sensor 12 generally being provided in the combustion chambers of the rocket engines) is integral with the launch base 7: in consequence, it does not make the rocket heavier and can be reused at least partially, after replacement of excessively damaged components.

In the case shown in FIG. 1, the body 5 has a hemispheric shape, but this is not a mandatory choice and other shapes are conceivable. This body 5 has a rounded surface oriented toward the throat 2 of the nozzle in order to generate an edgeless detached shock wave 8. The rounded shape of the body 5 has the advantage over a pointed shape of reducing the flow level received by the body 5; however, if a high flow level is judged acceptable, a pointed shape could also be used. The important factor is the interaction of the shock with the boundary layer on the wall of the nozzle, and not the shape of the shock close to the body 5. Hence it should be clear that the precise shape of the body generating this shock is of secondary importance. However, as in the case of the hemisphere in FIG. 1, it is preferable for a clear break line to separate the forward rounded surface from a rear surface, which may for example be plane, to prevent the creation of an nonsteady condition that would be inherent in a body of rounded shape. As to the dimensions of the body 5, it has been found that they should preferably be approximately the same as the cross section of the throat 2; typically, the diameter of said body is between 0.5 and 2 times and preferably between 0.8 and 1.5 times that of the throat. In any case, it is important for the body 5 not to be large enough to constitute a secondary throat, particularly in its furthest upstream position.

In general, it is preferable for the body 5 to have an axial symmetry; however, if the nozzle has a noncircular shape, for example, an octagonal shape, it is advisable for the body 5 to have a shape which, for this example, is roughly octagonal, generating a shock of which the intersection with the nozzle serves to initiate the separation of the boundary layer on the whole circumference of the nozzle before the local occurrence of the natural separation, of which the position in this case may depend on the location along this circumference. The shape and optimal dimensions of the body 5 may be determined for each specific case using numerical simulations and/or wind tunnel tests. One important optimization parameter is the angle of incidence of the shock wave 8 to the wall of the divergent portion: in fact, the larger this angle, the lower the local mechanical loads and the temperature rise to which said wall is subjected; at the same time, a too oblique incidence may not permit effective separation of the jet. One of the reasons why it is important to control the position of the body 5, and hence of the point of incidence 9, during the engine startup phase, is, precisely, that if said point of incidence 9 is located slightly upstream of the point where the "spontaneous" jet separation occurs, the boundary layer is considerably weakened and the jet separation may be caused even by a highly oblique shock wave 8.

The body of rounded shape 5 must be able to withstand the exhaust gas jet for about one second, or less. A wide choice of materials is available for its execution: metals, refractory ceramics, and also composite materials, and even oak kernel, if this is a consumable replenished at each firing.

The design of the rod 14 and the actuator 6 does not call for any particular remarks, except for the fact that said rod must be able to withstand, without buckling, a high axial load exerted by the exhaust gas flow on the body 5.

Figure 5:
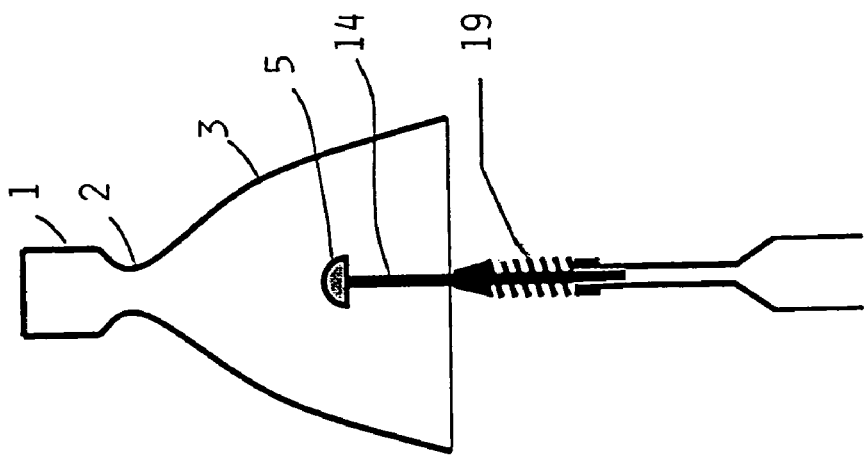
FIG. 5, a simplified version of the separation control device according to the invention, that operates in a restricted expansion ratio range.
Figure 4:
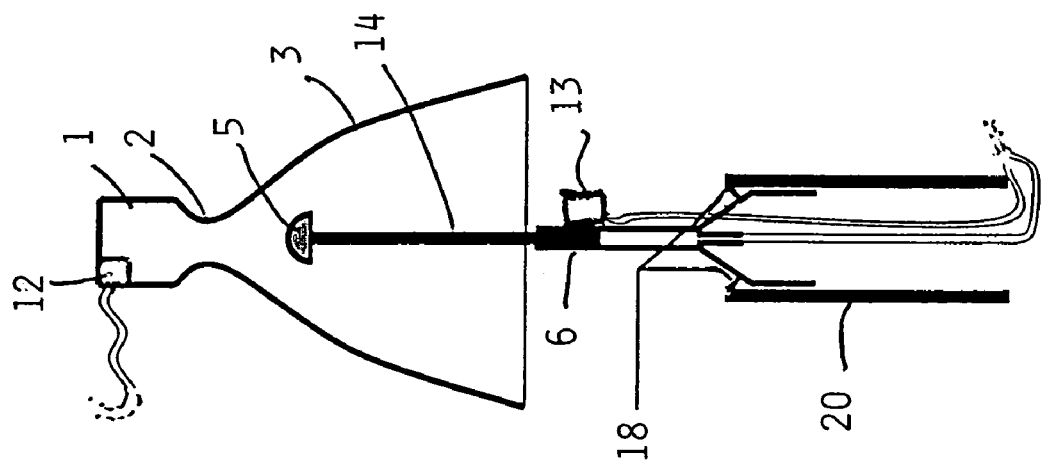
FIG. 4, the same jet separation control device according to the invention, to which a mechanical overload protection device is added.

If the axial load applied to the body 5, and hence to the rod 14, is too high, the latter may bend or break, and the body 5 may strike and damage the nozzle wall; the sudden pressure drop that accompanies the breakage of the rod may also affect the integrity of the nozzle. Such a situation could occur, for example, if due to a failure, the body 5 remains blocked in a defined axial position instead of progressively retracting. To avoid this type of risk, it is advantageous to provide a "mechanical fuse", that is, a part that moves or breaks under the load, permitting the expulsion of the body 5 before a dangerous pressure buildup occurs in the event of a failure of the actuator or of the controller. FIG. 5 shows an example of such a mechanical fuse, indicated by 18. In this embodiment, the actuator 6 is connected to a hollow cylindrical support 20 via rods 18; in case of mechanical overload applied in an axial direction by the exhaust gases, the rods break and the assembly consisting of the body 5, the rod 14 and the actuator 6 is ejected into said hollow cylinder.

A particularly important element of the device of the invention consists of the controller 15 which commands the movement of the body 5 during the engine startup phase, in a direction generally going from the throat (2) to the exit section 4 of the nozzle, according to the stagnation pressure $p_s$ of the gases in the combustion chamber 1. In fact, the actual controller may be of a conventional type (for example, a numerical PID); the really important factor is the determination of the position setpoint $x(p_s)$ of the body 5. In fact, as shown above, it is advantageous for the body 5 to be located at every instant close to an optimal position defined as the furthest downstream position, such that the jet separation is nevertheless caused by the incidence of the shock wave 8 to the wall of the divergent portion 3, and is not caused by the satisfaction of the condition expressed by equation [3] (or an equivalent condition). Obviously, the determination of said optimal position comprises the consideration of a sufficient safety margin, which is obtained, for example, by reducing the value of x_sep obtained by the application of equation [3] by 20%.

The flow topology described with reference to FIG. 1 is known by the name of free shock wave separation. In certain conditions, according to the nozzle geometry and the pressures at play, the flow separation induced by the shock wave 8 cannot develop along the wall of the divergent portion, because the pressure gradient causes the immediate reattachment of the boundary layer by creating a toroidal separation bulb on said wall. In these conditions, a wide recirculation zone is created in the central part of the jet downstream of the body of rounded shape: the flow typology then becomes very similar to that described in the abovementioned article by G. Hagemann et al. by the expression "restricted shock separation", also called separation by internal recirculation in the jet. This flow condition shown schematically in FIG. 3, in which the same numerals correspond to the same elements as in FIG. 3, the numeral 16 denotes the toroidal separation bulb and the numeral 17 the recirculation zone in the central part of the jet.

As in the case of the "free shock separation" shown in FIG. 1, the detached shock wave 8 produces a stable separation bulb, in a position upstream of the position at which a separation occurs spontaneously. The invention thus preserves its full utility in these conditions.

For particular nozzle geometries, and especially in the case of the Vulcain engine, the flow separation may be either of the free shock wave type, or the "internal recirculation in the jet" type, depending on the ratio of the stagnation pressure in the combustion chamber to the ambient pressure. Since the stagnation pressure increases during the startup phase from the atmospheric pressure to the nominal operating value, the type of separation varies over time. In the case of the Vulcain engine, for example, a transition is observed from a free shock separation condition to a internal recirculation in the jet condition, followed by a return to the free shock wave separation. These changes of conditions generate nonsteady side loads that are far stronger than in the case of exclusively free shock wave separation or exclusively separation by internal recirculation in the jet, and are therefore undesirable. In fact, the presence of the body of rounded shape 5 tends to favor separation by internal recirculation in the jet over free shock wave separation, because its drag itself creates a central recirculation zone. In consequence, the transitions from one condition to the other are eliminated, and the engine starts entirely in internal recirculation in the jet conditions. Thus the method of the invention has a particularly beneficial effect for this type of nozzle.

Figure 2:
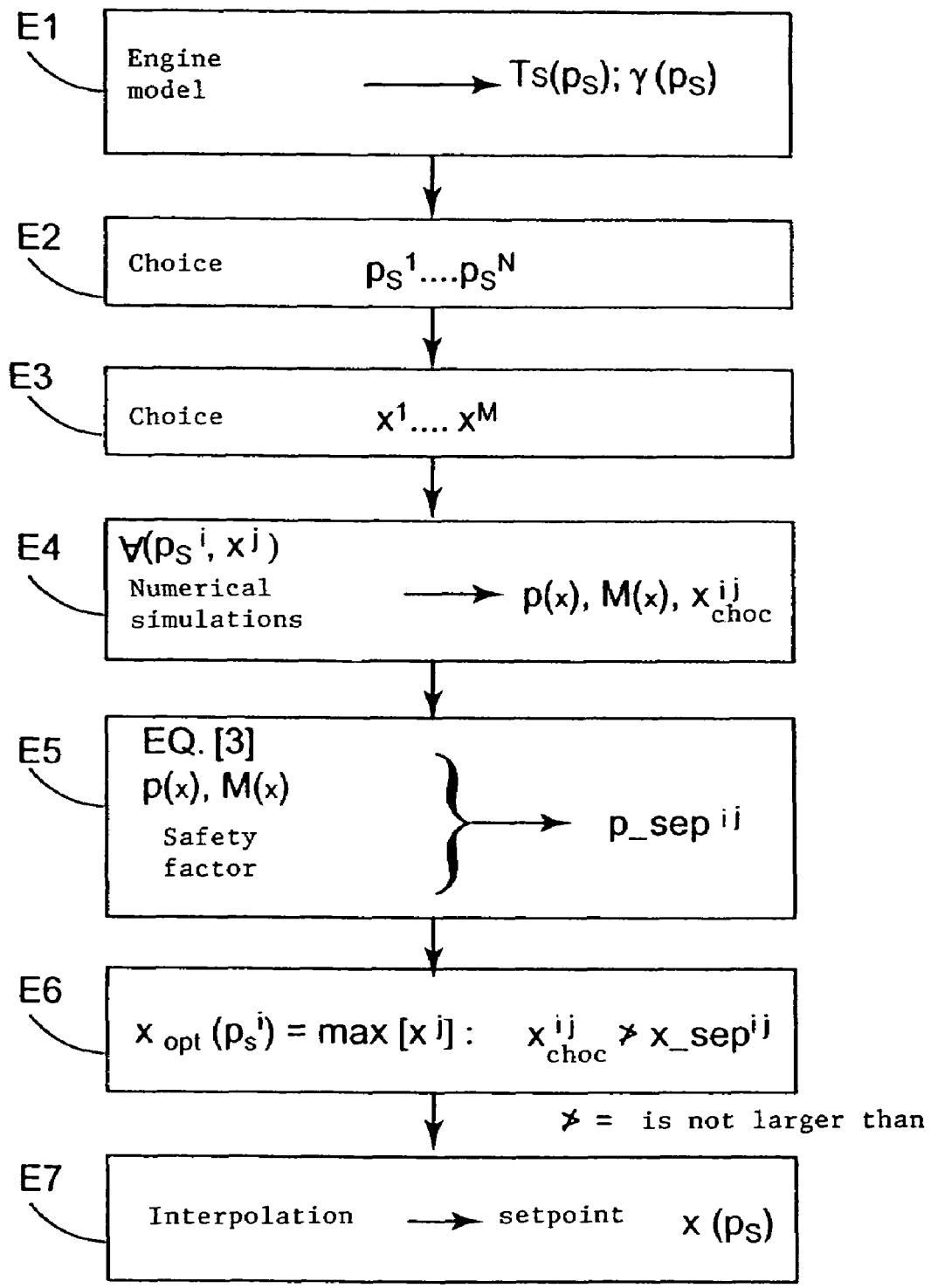
FIG. 2, a flowchart showing a method for determining a control law of the device in FIG. 1, for implementing a method according to the invention.

The flowchart in FIG. 2 shows a rational method for determining the position setpoint $x(p_s)$ of the body 5.

Firstly, step E1, a mathematical model of the rocket engine, is used to determine, as a function of the stagnation pressure $p_s$, the temperature $T_s$, in the combustion chamber and the isentropic expansion exponent Y of the exhaust gases (in fact, it is generally necessary to account for the fact that the composition of said gases, and hence the value of the parameter Y, varies during the startup phase). This model results from the determination of the average operating parameters upon startup of the engine during its bench qualification trials. Such trials are always conducted before the use of an engine on a launcher, and are hence not specific to the present invention.

Secondly, step E2 comprises the determination of the maximum value reached by the stagnation pressure of the gases in the combustion chamber 1, $p_s^{max}$, the minimum pressure being equal to the ambient pressure at the launch altitude $p_a$, and the choice of a series of N discrete values $p_s^1, \ldots, p_s^N$ between $p_s^{max}$ and $p_a$, the number N, for example 10, being a compromise between the desired fineness of the model and the computation volume accepted.

Thirdly, step E3 comprises the choice of a series of M discrete values $x^1, \ldots, x^M$ of the position of the body of rounded shape 5 comprised between the position of the throat 2 of the nozzle and that of its exit section 4, the number M, for example 10, being a compromise between the desired fineness of the model and the computation volume accepted.

Subsequently, step E4 comprises, for each pair of values $(p_s^i, x^j)$ the determination, particularly using numerical simulations and/or bench tests, of the pressure $p(x)$ and the Mach number $M(x)$ of the flow at any point of the nozzle, and also of the point of incidence 9 of the shock wave 8 on the walls of the divergent portion 3, indicated by $x_{shock}^{ij}$. The simulations are performed taking account of the values of the temperature $T_s$ and the exponent Y of the exhaust gases determined in step E1.

The effect of a nonzero ambient pressure $p_a$ is taken into account in step E5. In this step, it is checked whether the ambient pressure $p_a$ causes a spontaneous separation of the boundary layer (case of FIG. 1) or a separation by internal recirculation in the jet (case of FIG. 3) before the interaction of the boundary layer with the shock causes the detachment or separation by internal recirculation (in the rest of the text the term "separation" is used with reference to both flow conditions). This check is performed either by the bench test, or, for example, using the criterion of equation [3] or any other empirical criterion deemed to be more appropriate, the criterion being applied to the isentropic flow zone (if the criterion cannot be satisfied in the isentropic zone, the separation will be generated by the shock, provided that its position is sufficiently far back to interact with a weakened boundary layer; in fact, only the furthest backward positions of the shock are advantageous in the rest of the application of this process). This is used to determine the position of the separation characterized by x_sep. The superscripts i and j recall that this is the value of x_sep determined for a stagnation pressure $p_s^i$ and a position $x^j$ of the body 5. In fact, as suggested above, it is preferable not to use the value obtained directly by a criterion such as that of the equation [3] for $x\_sep^{ij}$, but to correct it by using a safety factor (for example, a 20% reduction).

In step E6, $x\_sep^{ij}$ is compared to $x_{shock}^{ij}$ (position of the point of incidence 9 of the shock wave 8 on the walls of the divergent portion 3). The optimal value of the position of the body 5 at the stagnation pressure $p_s^i$, $x_{opt}(p_s^i)$ is defined as the furthest downstream position of said body 5 such that $x\_sep^{ij}$ is not lower than $x_{shock}^{ij}$. When this condition is satisfied, the point of incidence of the shock wave 8 on the nozzle wall fixes the jet separation. This means that the optimal position of the body 5 for a given value of the stagnation pressure $p_s$ is the furthest downstream position such that the jet separation is caused by the shock wave 8 induced by said body 5, and not by the effect of the ambient pressure $p_a$. In other words, the optimal position of the body 5 for a given value of the stagnation pressure $p_s$ is the position such that said shock wave 8 is incident to the wall of said divergent portion at an axial position 9 corresponding to the downstream limit of the region of the divergent portion where a spontaneous jet separation does not occur under the action of the ambient pressure. It is clear that, since a finite number (M) of values of the position of the body 5 has been considered, the optimal position is only defined approximately.

In this way, an equation $x_{opt}(p_s)$ has been determined for N values of the pressure $p_s$; this equation gives the position setpoint of the body 5: $x(p_s)=x_{opt}(p_s)$. However, since this determination is made at the cost of relatively complex computations, the value of N is necessarily limited: it suffices to consider that, if N=M=10, N×M=100 numerical simulations or tests must be performed in step E4, at least in principle. Hence it is advantageous to provide a subsequent interpolation step E7, to obtain the setpoint $x(p_s)$ in analytical form, for example.

When sufficiently powerful computation means are available, steps E4 and E5 of the method of FIG. 2 can be brought together by a numerical solution of the Navier-Stokes equations integrating the atmospheric pressure effect from the outset and permitting a prediction of the position of the flow separation zone and also of its type (by free or restricted shock wave) without the need to use empirical criteria.

A method according to one embodiment of the invention for causing a stable jet separation in a nozzle of a rocket engine hence comprises the following steps:

prior to the start of the engine ignition phase, the insertion of the body of rounded shape 5 into the divergent portion 3 of the nozzle along its axis, up to a first axial position; this first axial position is calculated so as to correspond with the optimal position of said body (in the sense defined above) when the stagnation pressure $p_s$ reaches a sufficiently high value for a jet separation to occur, of which the mechanical effects on the nozzle are expected (as explained above, the mechanical loads generated at the throat of the nozzle at the very beginning of startup are not structurally dimensioning as long as the separation zone remains close to the throat);

during the ignition phase, the movement of said body of rounded shape 5 along the nozzle axis, in a direction generally going from the throat (2) to the exit section 4, in order to maintain said body constantly in an approximately optimal position.

If the engine nozzle is dimensiond so that when the stable stagnation pressure $p_s$ is reached, the gases are entirely recompressed outside the divergent portion, the problem of jet separation only arises during the startup phase. At the end of this phase, the body 5 will have reached a position so far downstream that it no longer has any effect on the flow in the nozzle, and can therefore be completely retracted. If, on the contrary, the operating conditions are such that a jet separation may occur even after the end of the startup phase, it may be necessary to combine the invention with one of the known devices of the prior art to eliminate the nonsteady side loads also during the first part of the rocket ascension phase.

A variant of the embodiment described above enables the device according to the invention to operate autonomously, without the need to receive pressure data from the combustion chamber. In fact, even if a pressure sensor 12 is generally provided in most modern launchers, the transmission of the data to the controller 15, via a launcher-ground connector or by telemetry, can raise problems of reliability. If these problems are considered as particularly important, the direct measurement of the pressure $p_s$ in the combustion chamber can be replaced by a measurement of the pressure $p_{sb}$ at the stagnation point of the body 5, that is, at the apex of the body. The pressure $p_{sb}$ is related to the pressure $p_s$ in the combustion chamber by a simple proportionality equation:

$$\frac{p_s}{p_{sb}} = \left[\frac{2\gamma}{\gamma+1}M^2 - \frac{\gamma-1}{\gamma+1}\right]^{\frac{1}{\gamma-1}} \times \left[\frac{2}{\gamma+1} \times \frac{1}{M^2} \times \frac{\gamma-1}{\gamma+1}\right]^{\frac{\gamma}{\gamma-1}} \quad [4]$$

where M is the Mach number upstream of the detached shock wave 8, calculated by the numerical methods of fluid mechanics. This embodiment of the invention requires a slight increase in the complexity and cost of the body of rounded shape 5, which must be provided on its apex with a pressure sensor (numeral 12' in FIG. 1) for the measurement of $p_{sb}$.

The embodiments of the invention described are suitable for eliminating the nonsteady side loads during the entire engine startup phase. In fact, these loads are particularly detrimental when they apply to the region of the divergent portion close to the opening, that is, toward the end of startup: in certain applications, it is sufficient to eliminate them only during this final phase, making it possible to use a simplified embodiment of the invention, not requiring the use of an actuator commanded by an actuator to retract the body of rounded shape. If the method of the invention is to be used only during the terminal phase of startup, the body of rounded shape 5 is initially placed in an axial position such that the incidence position of the shock wave 8 on the divergent section will be relatively close to the exit section 4 of the nozzle, and it is moved in a relatively restricted range of axial positions, corresponding to a restricted range of values of the stagnation pressure $p_s$ in the combustion chamber. Under these conditions, the setpoint $x(p_s)$ can reasonably be linearized. The axial load applied by the exhaust gas flow to the body of rounded shape and tending to expel it from the divergent portion of the nozzle is proportional to $p_{sb}$ and, as shown by equation [4] above, $p_{sb}$ is proportional to $p_s$ and depends on M which in turn depends on the position x of the body 5 and on the shape of the nozzle. In a limited range of variation of the position of the body 5, it is possible to approximate the latter implicit relationship by a linear relationship between $p_{sb}$ and x. It follows that the relationship between the setpoint of the position of body 5 and the aerodynamic load applied on this body can be approximated by a linear relationship. This approximate linear relationship of the position setpoint of the body 5 on the pressure $p_{sb}$ can then be obtained by a simple means of application of an elastic force opposing the expulsion of said body 5. This is shown in FIG. 5, where the controller 15 and the actuator 6 are replaced by the spring 19. It is easy to understand that this simple arrangement is suitable for obtaining a movement of the body of rounded shape 5 that is proportional to the axial load applied thereto. The choice of a spring with appropriate stiffness and prestress satisfies the linearized setpoint law. The spring 19 may be of any type appropriate to the specific application concerned: spiral, pneumatic, etc.

Figure 3:
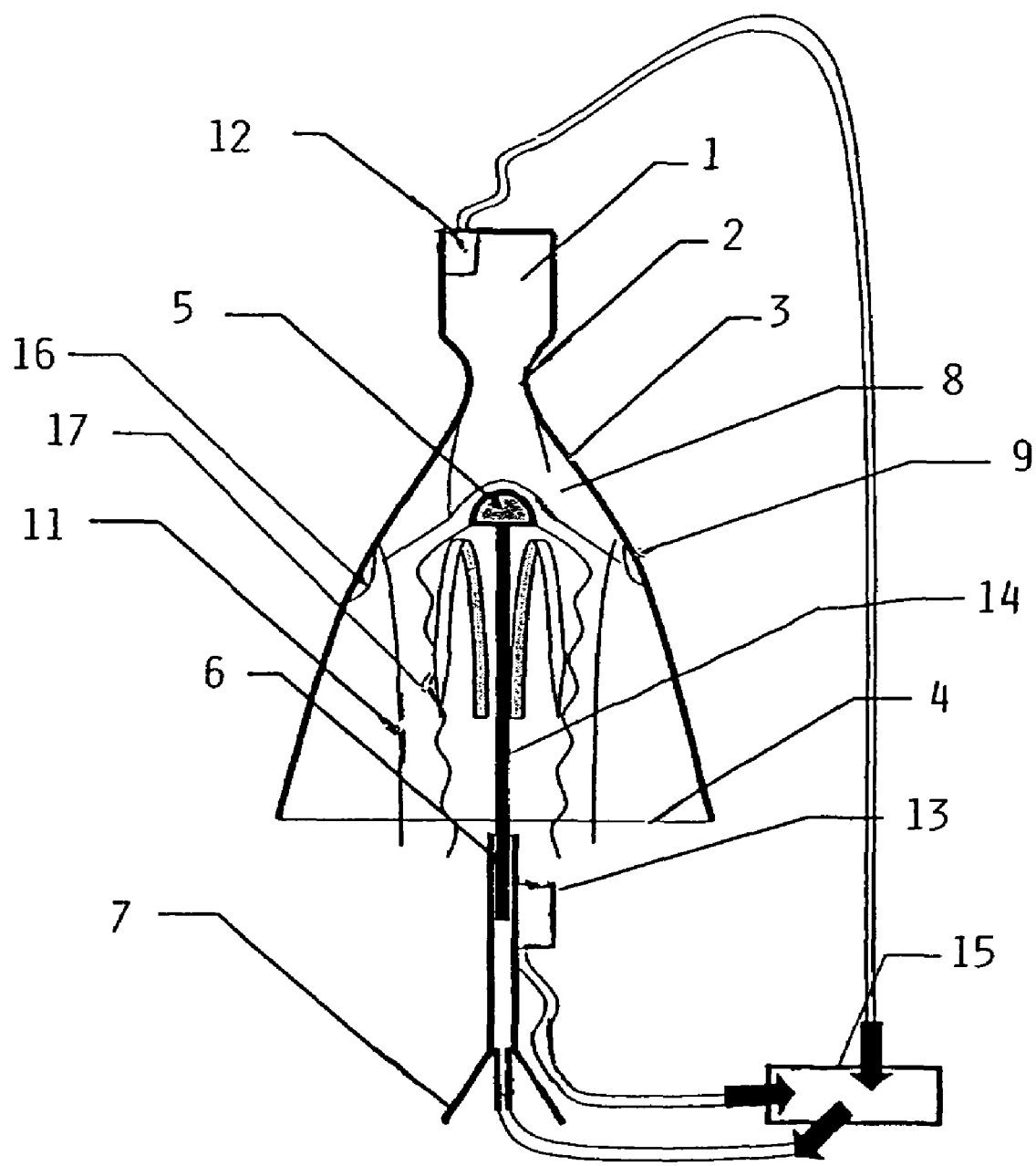
FIG. 3, the same jet separation control device according to the invention, arranged in operational configuration in the nozzle of a rocket engine, that presents a spontaneous internal recirculation separation mode in the jet.

The embodiment described above is not only much simpler than those described with reference to FIGS. 1 and 3, but is also more reliable because completely passive.

Another embodiment of the invention extends the simplification even further: in certain applications, the range of movement required for satisfactory elimination of the nonsteady side loads is sufficiently narrow to be considered as a point: in this case, it suffices to arrange the body of rounded shape 5 at the desired location using an appropriate means such as an actuator, without the need to move it during the rocket engine ignition phase. The fixed position of the body 5 is determined using the method described with reference to FIG. 2.

The invention claimed is:

1. A method for reducing the nonsteady side loads acting on a nozzle of a rocket engine during a startup phase of said engine, said nozzle comprising a combustion chamber where exhaust gases are generated, a divergent portion in which a supersonic flow of said exhaust gases occurs, and a throat connecting said combustion chamber to said divergent portion, which method comprises axially positioning a body along the divergent portion's axis for perturbing the flow of the exhaust gases inside the divergent portion such that said body does not form a secondary throat of the nozzle and that, during at least a fraction of said startup phase in which the stagnation pressure of the exhaust gases increases gradually, a shock wave, induced by the disturbance of the flow of the exhaust gases by said body is incident to the wall of said divergent portion at an axial incidence position where it produces a jet separation or a separation in the form of a toroidal separation bulb.

2. The method as claimed in claim 1, comprising:
prior to the startup of the engine, the insertion of said body inside the divergent portion along its axis, up to a first axial position; and
during the startup phase, the movement of said body along the nozzle axis according to a value of the stagnation pressure ($p_s$) of the exhaust gases in the combustion chamber so that, while the value of said stagnation pressure ($p_s$) of the exhaust gases varies during said startup phase, said shock wave continues to be incident to the wall of the divergent portion at an axial position where it produces a jet separation or a separation in the form of a toroidal separation bulb.

3. The method as claimed in claim 2, wherein the movement of said body along the nozzle axis according to a value of the stagnation pressure ($p_s$) of the exhaust gases in the combustion chamber is actuated so that said shock wave is incident to the wall of said divergent portion at an axial position corresponding to the downstream limit of the region of said divergent portion where a spontaneous jet separation or a spontaneous separation in the form of a toroidal separation bulb does not occur under the action of the ambient pressure.

4. The method as claimed in claim 1, wherein the movement of said body according to the stagnation pressure ($p_s$) of the exhaust gases in the combustion chamber follows a setpoint which is determined using the following steps:
choice of a series of discrete values of the stagnation pressure ($p_s$) of the exhaust gases in the combustion chamber, ranging between the atmospheric pressure and a maximum pressure reached during the startup phase (E2);

choice of a series of discrete values of the position of said body along the axis of the divergent portion, ranging between the position of the throat and that of the exit section of said divergent portion (E3);

for each pair of said discrete values, determination by calculation or by test of the value of static pressure and the Mach number along the wall of the divergent portion (E4) and determination of the shock impact point on the nozzle wall;

for each pair of said discrete values, determination of the axial position of the jet separation point or of the point of separation in the form of a toroidal separation bulb using said values of static pressure and of the Mach number of the exhaust gas flow along the wall of the divergent portion (E5);

for each of said discrete values of the pressure ($p_s$) of the exhaust gases in the combustion chamber, determination of the position of said body furthest downstream, such that the jet separation or the separation in the form of a toroidal separation bulb is caused by said shock wave induced by the presence of said body (E6);

said furthest downstream value being used as the setpoint value of the position of said body corresponding to said value of the stagnation pressure ($p_s$) of the exhaust gases in the combustion chamber.

5. The method as claimed in claim 4, further comprising an interpolation of said setpoint values of the position of said body corresponding to said values of the stagnation pressure ($p_s$) of the exhaust gases in the combustion chamber so as to determine a position setpoint in analytical form (E7).

6. The method as claimed in claim 4, wherein said axial position of the point of spontaneous jet separation or the spontaneous separation in the form of a toroidal separation bulb under the action of the ambient pressure is determined using an appropriate empirical or semiempirical criterion.

7. The method as claimed in claim 1, wherein said body is moved from said axial position toward the exit section of the divergent portion during the engine startup phase as the stagnation pressure ($p_s$) of the exhaust gases in the combustion chamber increases.

8. The method as claimed in claim 1, wherein said body for perturbing the flow of the exhaust gases is a body of rounded shape.

9. The method as claimed in claim 8, wherein said body of rounded shape has an axial symmetry and has a rounded front surface oriented toward the throat of the nozzle.

10. The method as claimed in claim 9, wherein said body has a cross section of between 0.5 and 2 times the cross section of the throat of the nozzle.

11. The method as claimed in claim 2, wherein said value of the stagnation pressure ($p_s$) of the exhaust gases in the combustion chamber is determined indirectly from a measurement of the stagnation pressure ($p_s$) of said exhaust gases corresponding to an apex of said body.

* * * * *

UNITED STATES PATENT AND TRADEMARK OFFICE
CERTIFICATE OF CORRECTION

| | | |
|---|---|---|
| PATENT NO. | : 7,603,842 B2 | Page 1 of 1 |
| APPLICATION NO. | : 11/359692 | |
| DATED | : October 20, 2009 | |
| INVENTOR(S) | : Dujarric | |

It is certified that error appears in the above-identified patent and that said Letters Patent is hereby corrected as shown below:

<u>Title page, item</u>

(*) Notice: Subject to any disclaimer, the term of this patent is extended or adjusted under 35 U.S.C. 154(b) by 656 days.

Delete the phrase "by 656 days" and insert -- by 896 days --.

<u>Title page,</u>

Item (57) ABSTRACT,

Line 11, "distrubance" should read -- disturbance --.

Signed and Sealed this

Seventh Day of September, 2010

David J. Kappos
*Director of the United States Patent and Trademark Office*